Feb. 27, 1940. A. M. BARRETT Re. 21,371

PORTABLE DISPLAYER

Original Filed June 29, 1938 3 Sheets-Sheet 1

Inventor:
Arthur M. Barrett

By Brown, Jackson, Boettcher & Dienner
Attys

Feb. 27, 1940. A. M. BARRETT Re. 21,371

PORTABLE DISPLAYER

Original Filed June 29, 1938 3 Sheets-Sheet 2

Inventor:
Arthur M. Barrett

By Brown, Jackson, Boettcher & Dienner
Attys

Feb. 27, 1940. A. M. BARRETT Re. 21,371

PORTABLE DISPLAYER

Original Filed June 29, 1938 3 Sheets-Sheet 3

Inventor:
Arthur M. Barrett

By Brown, Jackson, Boettcher & Dienner
Attys

Reissued Feb. 27, 1940

Re. 21,371

UNITED STATES PATENT OFFICE 21,371

PORTABLE DISPLAYER

Arthur M. Barrett, Winnetka, Ill., assignor to The Barrett Bindery Co., Chicago, Ill., a corporation of Illinois Original No. 2,159,612, dated May 23, 1939, Serial No. 216,537, June 29, 1938. Application for reissue November 8, 1939, Serial No. 303,372

11 Claims. (Cl. 281—33)

This invention relates to portable displayers of the easel binder type, such as are used by salesmen and others in presenting to prospective customers sales literature, pictures, charts, and other material in convenient form.

Heretofore, binders that were adapted to be supported in a vertical position for the purpose of displaying advertising and sales literature or the like have embodied various kinds of auxiliary supports which have been rather unsightly and cumbersome to manipulate, and, moreover, cannot always be relied upon to support the device rigidly and firmly in display position. For example, loose leaf binders have been constructed with a brace or panel secured to the "backbone" or rigid central section of the binder, but without any particular means for holding the covers in their extended or unfolded position for display. Further, such binders usually require an extra operation when folding up the binder after the completion of a sales presentation, and in addition there was always some likelihood that the display supporting portion of the binder might move outwardly, either partially or wholly, into a display position after the binder had been closed.

The object and general nature of this invention is the provision of a portable displayer in the form of an easel binder which can be quickly set up in display position and taken down with equal rapidity without requiring any more manipulation than merely opening or closing the binder as if it were a book. Another feature of this invention is the provision of a portable displayer which cannot fall down or shift its position when arranged for display, and in which the various parts of the binder are supported firmly and positively in display position.

Another important feature of this invention is the provision of a binder of the easel type in which the supporting easel section thereof is substantially coextensive with the cover panels of the binder and acts as the cover for the binder, therefore providing, first, an exceptionally neat appearing unit when closed, second, a sturdy support for the sheets or other material to be displayed, third, a display device which can be removed from display position and folded or closed in one motion, and fourth, a display binder in which, when folded, there is no danger that the inner and outer cover sections will accidentally become separated.

These and other objects and advantages of this invention will be apparent to those skilled in the art after a consideration of the following detailed description of the preferred structural embodiment of this invention, taken in conjunction with the accompanying drawings illustrating the preferred embodiment.

Figure 1:
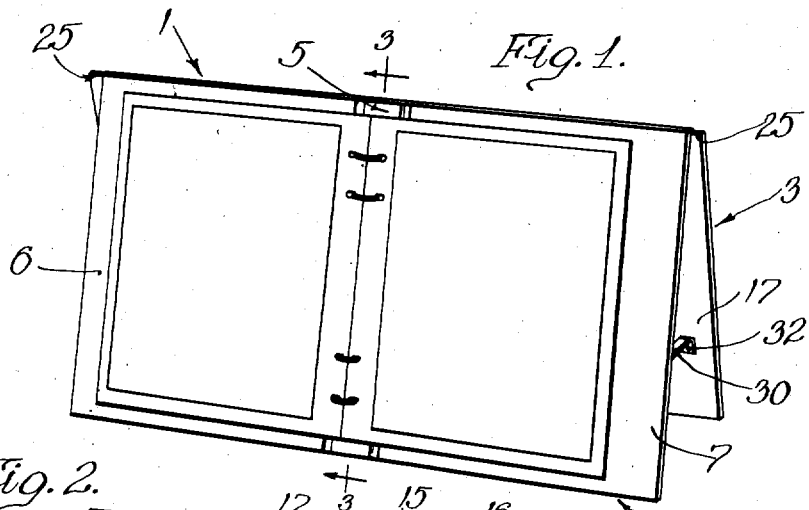
Figure 1 is a front view of a portable display binder shown in its open or display position.

Referring now to the drawings, more particularly to Figures 1 to 4, the portable displayer in which the principles of the present invention have been embodied is indicated in its entirety by the reference numeral 1 and includes inside and outside cover sections 2 and 3. The inside cover section consists of a relatively narrow back portion 5 and a pair of cover panels 6 and 7. The cover panels 6 and 7 may be of any suitable construction and are hingedly connected to the edges of the central portion 5, which carries the sheet receiving or binding means and cooperates therewith to form the "backbone" of the binder. Preferably, the binding means is of the loose leaf variety, embodying hinged rings or arches, but it is to be understood that any form of binding means may be used, as desired.

Figure 7:
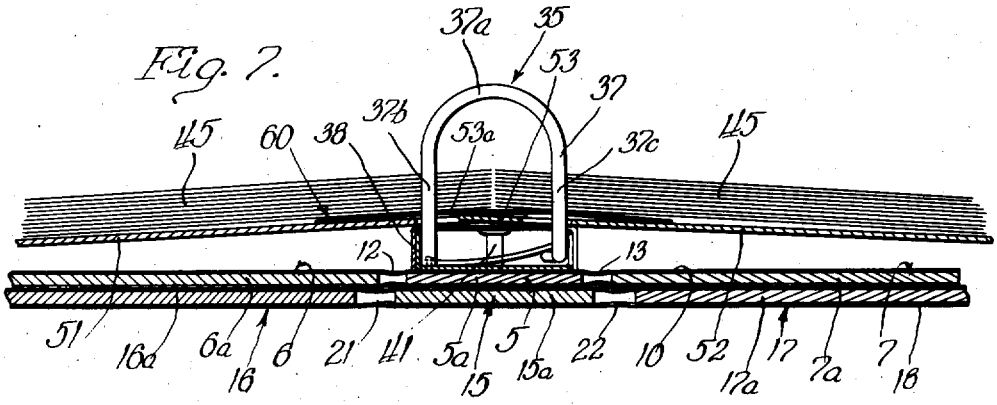
Figure 7 is an enlarged section taken along the line 7—7 of Figure 5.
Figure 8:
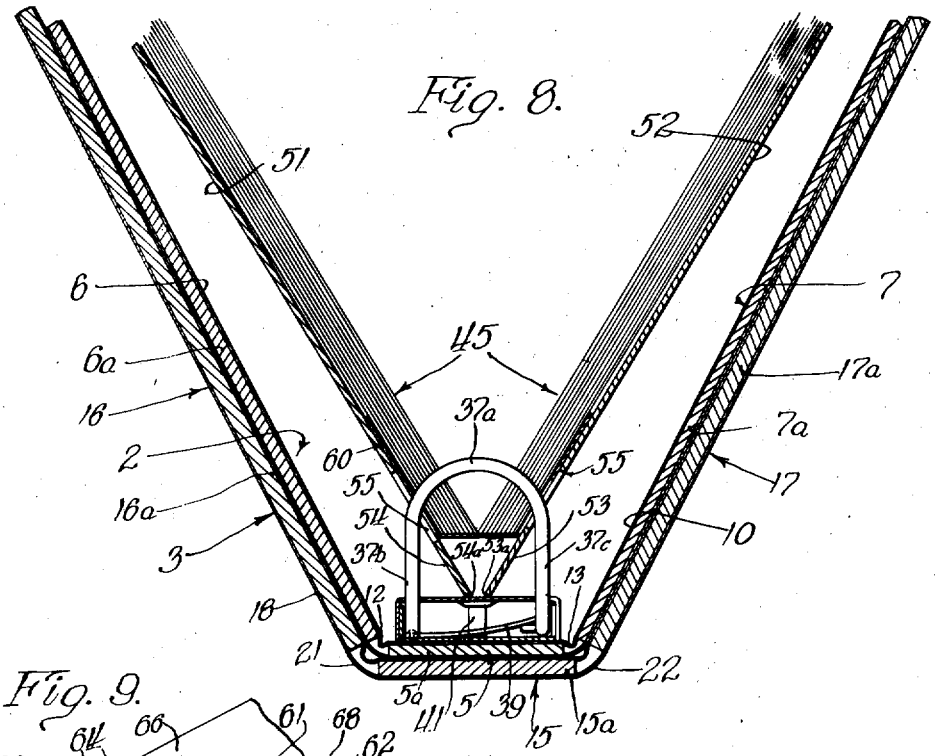
Figure 8 is a section similar to Figure 7, showing the action of the booster leaves in raising the sheet onto the curved portions of the arches during the closing of the binder.

For example, referring to Figures 7 and 8, the center section 5 consists of a strip of wood, fibre board, or the like, indicated at 5*a*, and the inside cover panels 6 and 7 consist of sheets of heavy fibre board or the like, indicated at 6*a* and 7*a*. The portions 5*a*, 6*a*, and 7*a* of the inside cover section 2 are enclosed by any suitable material, such as fabric or the like, indicated at 10, as in the usual construction, the panel sheets 6*a* and 7*a* being separated from the center sheet 5a by a space, and the fabric binding at this point forming hinges 12 and 13 by means of which the inside cover panels 6 and 7 can swing with respect to the central arch supporting portion or backbone of the binder.

Figure 3:
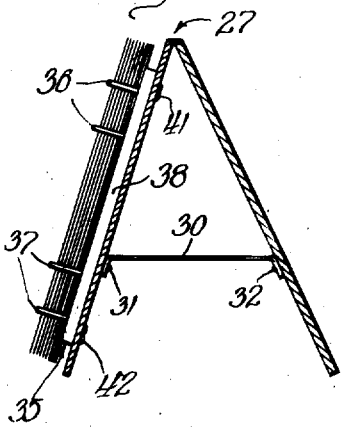
Figure 3 is a section taken generally along the line 3—3 of Figure 1.

The outside cover section 3 is formed similar to and is substantially coextensive with the inside cover section 2; in fact, the outer cover section 3 extends outwardly beyond and downwardly below the inside cover section 2, as clearly indicated in Figures 1, 4 and 5. The outside cover section 3 consists of a central portion 15 and cover panels 16 and 17. The central portion 15 is made up of a narrow strip of wood, fibre board, or the like, indicated at 15a, and similarly the outside cover panels 16 and 17 include sheets of fibre board or the like, indicated at 16a and 17a, respectively. The outside cover panels and the central panel section 15a are covered by a binding of fabric or the like, indicated at 18, and the central strip 15a is separated from the panel sheets 16a and 17a by a space, forming hinges 21 and 22. The central strip 15a of the outer cover section is slightly wider and longer than the inside central section, whereby both inside and outside cover panels can be swung together into and out of closed and open positions merely by grasping the outside cover panels. The outside cover panels 16 and 17 are slightly wider than the inner panels 6 and 7, extending beyond the edges of the inside cover panels 6 and 7 as indicated at 25 in Figure 1, and the inside and outside cover sections 2 and 3 are hingedly connected together along their upper edges as indicated at 27 in Figure 3. Preferably, this hinge is formed, like the hinges 12, 13 and 21, 22 described above, by the binding of fabric or other material of which the two cover sections are constructed. A pair of flexible tapes 30 are riveted, as at 31 and 32, or otherwise secured at their ends to the opposite cover panels 6, 16 and 7, 17. As best shown in Figures 1 and 3, the tapes 30 are fastened adjacent the outer side edges of the panels and spaced upwardly from the bottom edges a sufficient distance so that when the binder is closed, as in Figure 4, the tapes lie between the panels and are not exposed.

Figure 2:
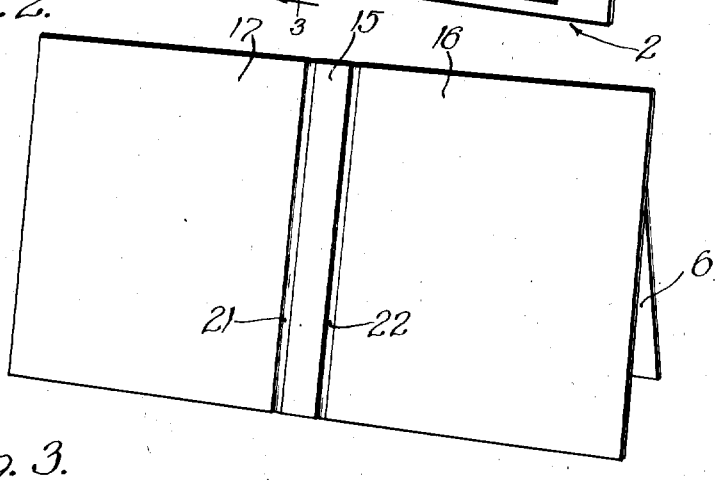
Figure 2 is a back view of the binder shown in Figure 1.
Figure 4:
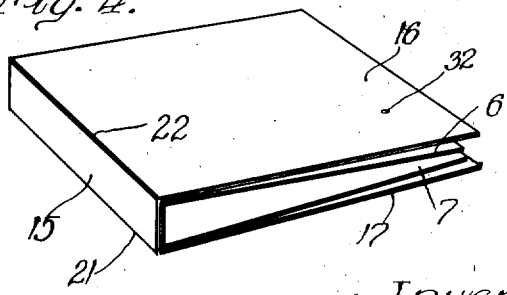
Figure 4 is a perspective view of the binder shown in its closed or folded position.
Figure 5:
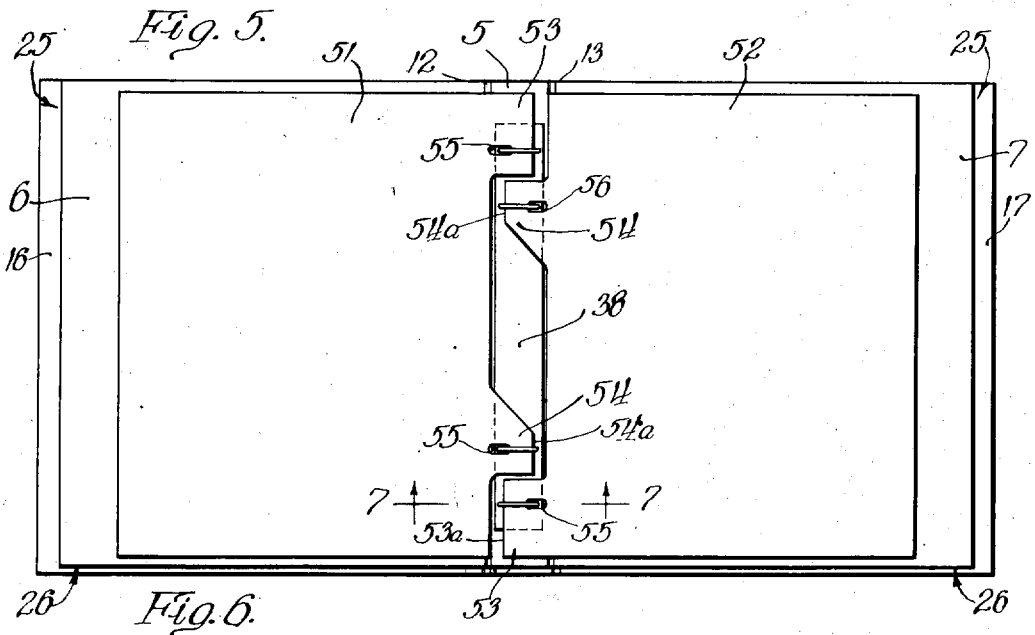
Figure 5 is a front view of the binder in its open position, showing the form and arrangement of the booster leaves which raise the sheets during the closing of the binder.

Figures 1 to 3, inclusive, illustrate the display position of the binder, and Figure 4 illustrates the closed or folded position. To set up the binder for display, all that it is necessary to do is to open the binder as if it were a book, bring the inside and outside covers in an extended or planar relation, and then swing the outside cover section 3 rearwardly away from the front or inside cover section 2, to the position shown in Figures 1 to 3. The binder will then remain in its substantially vertical position, resting on the lower edges of the inside and outside cover sections. Since the two sections are at an angle to one another (Figure 3) there is no likelihood of the binder accidentally closing, since each section holds the other in extended position positively and firmly and without any danger of the binder falling or shifting its position.

The binder may be moved from its display position (Figure 1) to a closed position (Figure 4) in one motion and in a few seconds, simply by grasping the two top outside corners, which closes the inside and outside covers against one another, and then folding the covers over toward one another. The outside cover panels 16 and 17, it will be noted, completely enclose and overlie the inside cover panels 6 and 7 so that, for all practical purposes, the outside cover panels 16 and 17 constitute the outside of the binder, with the result that the binder is capable of being opened and closed in the manner of an ordinary book without any possibility that supporting tabs or the like will catch on or get in the way of other articles or displays that may be carried with the binder. The covers 16 and 17 may be provided with handles if desired, in which case the handles preferably will be arranged so that they can be brought together merely by the act of closing the binder.

The loose leaf ring binder unit, mentioned above as serving to reenforce the central portion or back 5 of the inside cover section 2, is indicated in its entirety by the reference numeral 35 and may be of any suitable construction. Preferably, however, the unit 35 includes two pairs 36 and 37 of "rings" or arches, each of which has an outer arcuate section and straight sides or legs. One leg of the arch of each pair is connected to the corresponding leg of the adjacent arch to thereby form a hinge which is pivotally received by a supporting member 38, which may be in the form of a sheet metal tube or the like and enclosing suitable spring means 39 for releasably holding the arches 36 and 37 in their closed position. The rigid supporting member 38 is riveted or otherwise fixedly secured to the back 5 of the inside cover section, as indicated at 41 and 42. The arcuate portion of the arch 37 is shown in Figure 7 by the reference numeral 37a, and the straight sides or leg portions of the arch 37 are indicated at 37b and 37c.

Figure 6:
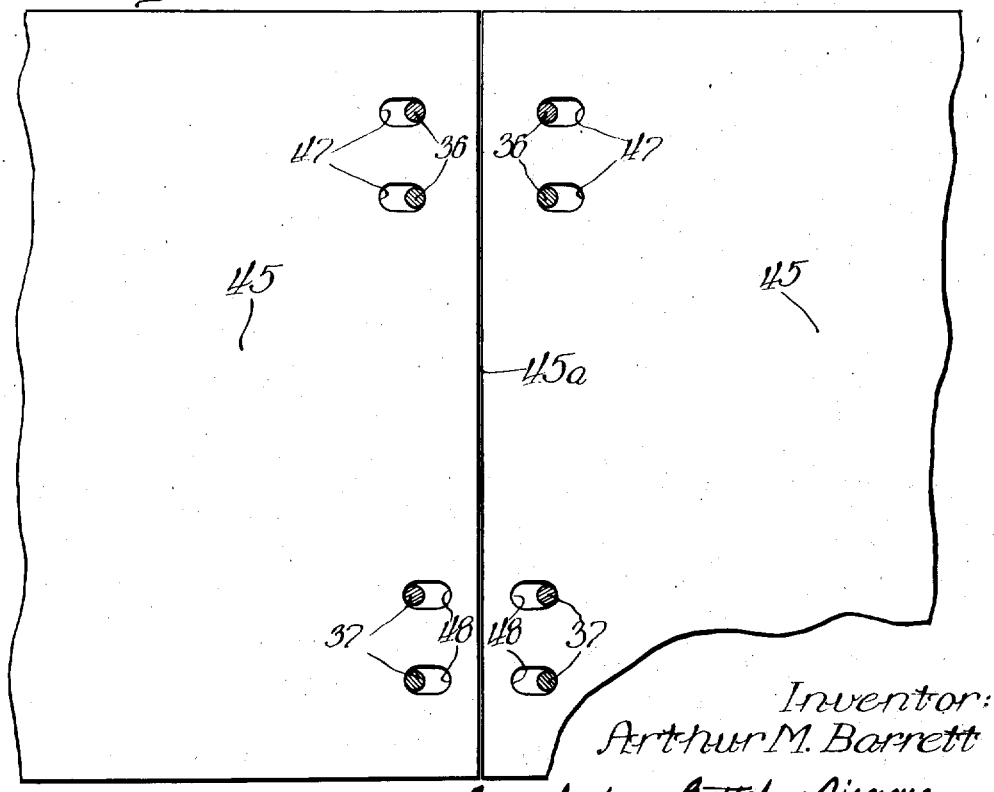
Figure 6 illustrates the form of sheets preferably employed in the binder for display purposes.

The sheets or leaves with which the binder 1 is normally provided are indicated at 45 in Figures 6, 7 and 8. The sheets 45 are punched to provide pairs of elongated slots 47 and 48, and preferably the sheets 45 are punched so that the openings 47 are spaced further from the inside edge, indicated at 45a, than the lower openings 48. The purpose of this arrangement is to provide sheets or pages that do not sag or fall down when they are supported generally vertically in display position. As best indicated in Figure 6, the weight of each sheet causes the inner ends of the upper slots 47 to bear against the associated arches, and similarly the outer ends of the lower slots 48 bear against the side portions of the lower arches 37. Thus supported in this manner, the sheets 45 are held with their inner edges 35a in accurate alignment or registry, even though the sheets are displayed substantially vertically. This is an important feature in a display binder of the easel type in that photographs, charts, maps, and the like, which may extend over two pages, may be shown, but the inner margins of the two sheets are maintained in substantial registry without any unsightly center gap or bulge.

In a binder in which sheets, punched as just described, are used and displayed in substantially vertical position, it is quite desirable to have the associated rings or arches provided with straight portions, as at 37b and 37c mentioned above, so that the inner margins of the sheets will be held accurately in close registering relation and, where desired, the sheets may be printed for a two-page display in which one half of the display is on one page and the other half is on the other page. However, when this feature is employed in a display binder having the advantage mentioned above of being capable of being closed with one motion and in a few seconds time, it is very desirable to provide means for lifting the sheets off of the straight portions of the arches and onto the arcuate portions thereof, whereby to facilitate the closing of the book and to prevent binding of the sheets on the lower or inner portions of the arches. To this end, therefore, the present invention contemplates the provision of a pair of booster fly leaves indicated in Figures 5, 7 and 8 by the reference numerals 51 and 52. These booster leaves are formed of relatively heavy stock and are quite stiff. Each booster leaf is provided with two tabs 53 and 54. The tab 53 is disposed adjacent one edge of the booster leaf, while the other tab 54 is disposed inwardly. Each tab is punched to form an elongated slot, as indicated at 55. The tabs 53 and 54 and the slots 55 are formed so that, while the booster leaves are identical, when one booster leaf, as at 52, is turned end for end and then brought into position to receive the lower arch of each pair of arches 36 and 37, the tabs of the reversed booster leaf 52 lie alongside the tabs 53 and 54 of the other booster leaf 51. This arrangement brings the inner marginal edges 53*a* and 54*a* of the tabs closely adjacent to the side of the associated arch opposite the side which is received in the associated slot 55.

In operation, when the binder is to be closed and the cover sections 2 and 3 swing about their hinges 12, 13 and 21, 22 with respect to the "backbone" of the binder, the hinging movement of the cover panels swings the booster leaves 51 and 52 from the position shown in Figure 7 through the position shown in Figure 8. During this movement the booster leaves 51 and 52 fulcrum about the inner edges 53*a* and 54*a* of their tabs and lift the sheets 45 up to the arcuate portions 36*a* and 37*a* of the arches 36 and 37. This lifting action is materially facilitated due to the fact that the fulcrum edges 53*a* and 54*a* lie a considerable distance away from the side of the arches that passes through the slots in the tabs, whereby the angular movement of the booster leaves during the closing of the binder is sufficient to cause the sheets 45 to be raised entirely onto the arcuate portions of the arches, as just mentioned. If the booster leaves 51 and 52 were not provided and an attempt were made to close the display binder by grasping the two top outside corners and closing the inside and outside cover sections together and then swinging them about their hinges, there might be some likelihood of the sheets 45 jamming or binding on the straight portions of the arches, with consequent likelihood of tearing or defacing the inner margins of the sheets.

Figure 9:
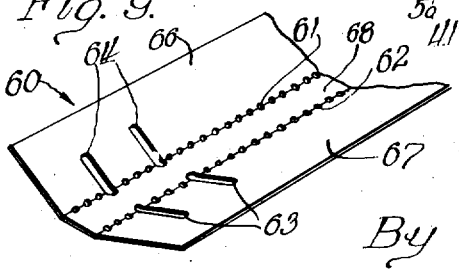
Figure 9 is a small perspective view of the auxiliary member cooperating with the booster leaves.

To facilitate the movement of all of the sheets 45 onto the arcuate portions of the arches, I provide an intermediate lift strip that is indicated in its entirety by the reference numeral 60 in Figure 9. The strip 60 consists of a narrow band of stock having fold lines 61 and 62 formed therein and slotted, as at 63 and 64, to receive the pairs of arches 36 and 37. The fold lines 61 and 62 are formed so that the side portions 66 and 67 of the member 60 are freely movable relative to the center section 68. The lift strip 60, as best shown in Figures 7 and 8, is placed between the inner margins of the sheets 45 and the booster leaves 51 and 52. When the latter are swung upwardly, as in closing the binder, it will be seen from Figure 8 that the lift strip 60, upon which the booster leaves 51 and 52 act directly, serves to lift or raise all of the sheets 45 onto the arcuate portions 36*a* and 37*a* of the arches. Also, the member 60 serves to prevent any interference between the inner margins of the sheets 45 and the edges 53*a* and 54*a* of the booster leaf tabs 53 and 54 when the binder is opened for display, as in Figure 1.

While I have shown and described above the preferred structure in which the principles of the present invention have been embodied, it will be understood that my invention is not to be limited to the specific details shown and described above, but that, in fact, widely different means may be employed in the practice of the broader aspects of my invention.

What I claim, therefore, and desire to secure by Letters Patent is:

1. A portable displayer comprising a central member, sheet binding means permanently associated therewith, panels hingedly connected to said central member for folding movement, and a cover unit comprising a central member and a pair of cover panels hingedly connected to said central cover member, the latter and said cover panels being hingedly connected to said first mentioned central member and panels along their upper edges whereby the cover panels completely enclose the first mentioned panels when the displayer is closed and serve as a supporting easel when the displayer is open.

2. An easel binder comprising an interior central member carrying a rigid ring support thereon, binding rings carried by said support, a pair of interior panels hingedly connected to said interior central member, and a cover section comprising a central rigid section and a pair of cover panels at least as large as said interior panels, and means hingedly connecting the interior panels and central member along their upper edges to said cover panels and associated central member, said cover section serving to support said interior panels and associated parts in generally upright position, said interior panels being supported along their hinge edges by said central interior member and along their upper edges by said cover section.

3. A portable displayer comprising a pair of inner and outer cover sections, each of said sections consisting of a central relatively narrow member and a pair of panels hingedly connected therewith for swinging movement relative thereto, means hingedly connecting the upper edges of the panels and central member of the inner section to the upper edges of the panels and central member, respectively, of the outer cover section, said displayer being adapted to be set in upright position on the lower edges of said cover sections when the latter are swung away from one another, and sheet receiving means carried by the inner cover section.

4. An easel binder comprising a narrow back-carrying leaf-receiving means and a pair of side panels hingedly connected to said narrow back for opening and closing movements with respect thereto, and an easel section hingedly connected to the upper edges of said back and panels and adapted thereby to be swung away from the latter to support the binder in a position for viewing and to be folded toward said back and panels, said easel section including a back and side panels substantially coextensive with said first mentioned back and panels and serving as covers for the latter and means hingedly connecting the side panels of said easel section to the back thereof.

5. A display binder comprising substantially identical inner and outer cover sections, each section consisting of a relatively narrow back member and a pair of panels hingedly connected to opposite edges of the back member, means hingedly connecting the upper edges of said sections together, with the back members hinged together and the corresponding panels of the two sections hinged together whereby when the sections are folded against one another the binder may be closed and when the outer section is swung away from the other section or inner section, the binder is supported in display position, and a leaf receiving unit fixed to the inner section and adapted to receive and support leaves for display.

6. A display binder comprising inner and outer cover sections, each section consisting of a relatively narrow back member and a pair of panels hingedly connected to opposite edges of the back member, means hingedly connecting the upper edges of said sections together, and means secured to the associated hingedly connected panels of the inner and outer cover sections for limiting the swinging movement of the outer cover section relative to the inner cover section.

7. An easel binder comprising an inner cover having a central section and panels hinged to the edges of the central section, leaf receiving arches, each arch having two straight sides and a connecting arcuate part, mounting means operatively securing said arches to the central section of the inner cover, and an outer cover hingedly connected to the upper edges of said central section and panels of the inner cover and formed with an outer central section and outer panels hingedly connected together corresponding to the inner cover, said outer cover serving as an easel to support the binder in display position and the panels of the outer cover being substantially coextensive with the inner panels so that the binder may be closed by grasping the panels of the outer cover and folding them toward one another.

8. A display binder comprising inner and outer cover sections each section consisting of a pair of panels and a relatively narrow back member by which said panels are hingedly connected, means hingedly connecting the upper edges of said sections together, means secured to the associated hingedly connected panels of the inner and outer cover sections for limiting the swinging movement of the outer cover section relative to the inner cover section, and sheet supporting means carried on and permanently associated with said inner cover section.

9. A display binder comprising inner and outer cover sections each section consisting of a pair of panels and a relatively narrow back member by which said panels are associated in hinged relation, sheet holding means permanently associated in register with said back member of the inner section, means hingedly connecting the upper edges of said sections together, and means secured to the associated hingedly connected panels of the inner and outer cover sections for limiting the swinging movement of the outer cover section relative to the inner cover section.

10. A display binder comprising inner and outer cover sections, each section consisting of a pair of hingedly connected panels, means hingedly connecting the upper edges of said sections together, means secured to the associated inner and outer cover sections for limiting the swinging movement of the outer cover section relative to the inner cover section, and sheet supporting means carried on and permanently associated with said inner cover section.

11. A display binder comprising inner and outer cover sections, each section consisting of a pair of panels and a relatively narrow back member by which said panels are associated in hinged relation, sheet holding means permanently associated in register with said back member of the inner section, means hingedly connecting the upper edges of said sections together, and means secured to the associated inner and outer cover sections for limiting the swinging movement of the outer cover section relatively to the inner cover section.

ARTHUR M. BARRETT.